Figures 1, 2:
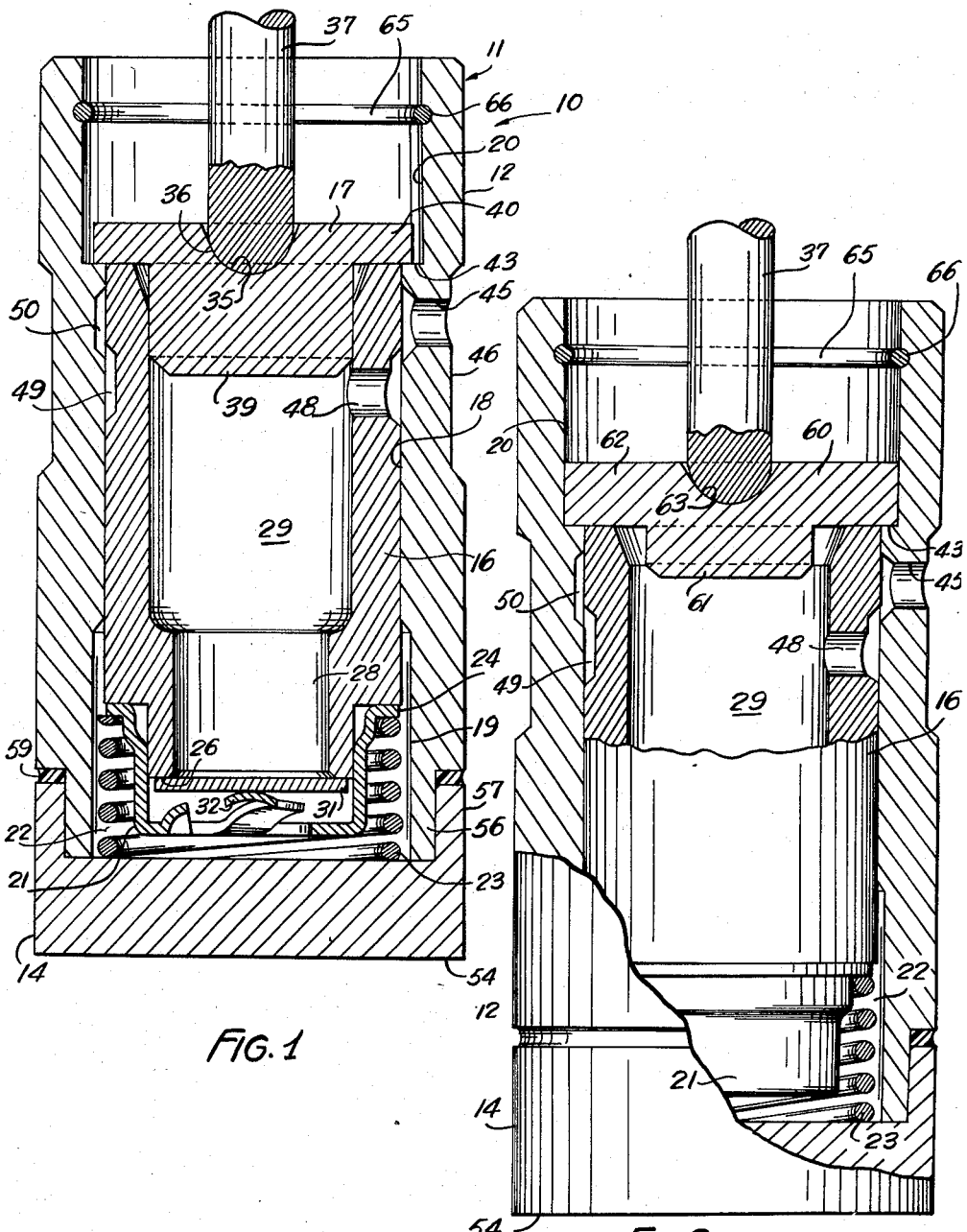

July 5, 1960

G. D. LINE 2,943,613

HYDRAULIC TAPPET

Filed March 19, 1959

INVENTOR.
GERALD D. LINE
BY Hudson, Boughton
Williams, David & Hoffman
ATTORNEYS

United States Patent Office 2,943,613
Patented July 5, 1960

2,943,613
HYDRAULIC TAPPET

Gerald D. Line, Royal Oak, Mich., assignor to Eaton Manufacturing Company, Cleveland, Ohio, a corporation of Ohio Filed Mar. 19, 1959, Ser. No. 800,447

7 Claims. (Cl. 123—90)

This invention relates to tappets and more particularly to hydraulic tappets as used in internal combustion engines.

The invention is generally characterized by the provision of a hydraulic tappet or valve lifter for use in the valve linkage of internal combustion engines and comprising a hollow body of a composite or fabricated construction containing a stepped bore, in which are reciprocably mounted a piston and an associated push rod receiving socket or thrust member, the body presenting a shoulder between stepped bores against which the socket member is adapted to seat or bottom.

It is an object of this invention to provide a hydraulic valve lifter or lash eliminating tappet of the above mentioned character having a two-piece fabricated body comprising a substantially cylindrical or tubular portion and an end closure member secured thereto by suitable means such as welding or resinous cements, the closure member preferably being hardened and presenting a bottom face or surface to be contacted by, or to ride on, the cam of a valve gear train.

It is another object of this invention to provide a hydraulic tappet comprising a composite body structure having a plurality of bores of differing sizes in which the plunger or piston and the push rod receiving socket or thrust member are adapted to reciprocate to take up lash or end play occurring in the valve operating mechanism, and in which the movement of the plunger and socket member in the bores is governed by hydraulic fluid against which the plunger acts, the rest position of the socket member and the plunger being limited by a step or a transversely extending shoulder within the bores.

As an additional object of this invention aims to provide a hydraulic tappet representing a novel combination and arrangement of parts, capable of being produced by rapid and efficient methods of manufacture, and which performs in a reliable and consistent manner.

Other objects and advantages of the invention will appear from the following detailed description taken in conjunction with the accompanying sheet of drawings forming a part of this specification, and in which:

Fig. 1 is a sectional view of a tappet embodying this invention, the view being taken substantially along the vertical axis thereof, and Fig. 2 is a sectional view similar to Fig. 1, but illustrating a modification of the invention.

A hydraulic tappet illustrating one embodiment of the invention is indicated generally at 10 in Fig. 1, and finds application as a part of a valve mechanism for internal combustion engines wherein it is adapted to be interposed between the cam and the push rod of the valve linkage, and there serves to transmit linear motion and to take up lash or end play in such linkage.

The tappet 10 comprises a generally cylindrical composite or fabricated body 11 including a hollow cylindrical portion or tube 12 and an end closure member 14 mounted in sealing engagement at one end thereof. A hollow plunger or piston 16 is reciprocably mounted in the body 11, and a push rod socket or thrust member 17 is in axial engagement and reciprocable with the plunger.

The tubular portion 12 has a number of differently sized bores 18, 19, and 20, the bore 18 having the plunger 16 closely and slidably received therein, and the bores 19 and 20 being in the form of counterbores at the ends of the tubular portion 12.

The plunger 16 has mounted on the inner end thereof a cup-shaped cage or check valve housing 21 extending into a high pressure chamber 22 defined in the bore 19 between the plunger and the end closure member 14. A compression spring 23 is disposed in the chamber 22 in engagement with a flange or rim 24 of the cup-shaped valve housing 21 and resiliently urges the housing and the plunger outwardly or away from the end closure member 14.

Within the check valve housing 21, and seated against an annular boss 26 surrounding an oil passage 28 communicating with the interior 29 of the plunger 16, is a check valve 31 which may conveniently be in the form of a disk. In this embodiment the valve housing 21 has formed as an integral part thereof a check valve biasing spring 32 normally maintaining the disk 31 in a seated position.

The push rod socket or thrust member 17 is in axial engagement with the outer or open end of the plunger 16, as a closure member or cover for the plunger chamber 29, and is provided with a spherical seat or socket 35 for receiving the rounded end 36 of a push rod 37. The socket member 17 has a central boss 39 and a radially extending flange 40, and is disposed with the boss received in the hollow plunger 16 for rendering the chamber 29 thereof a closed reservoir or oil supply chamber, and with the flange 40 received in the counterbore 20.

The flange 40 of the socket member 17 is substantially smaller in diameter than the bore or counterbore 20, but is larger in diameter than the plunger 16 and overhangs the latter so as to be adapted to abut or seat on a transverse surface or shoulder 43 facing axially outward between the stepped bores 18 and 20. The central boss 39 co-operates with the plunger 16 to center the socket member 17 against radial displacement by transverse components of the reaction of the push rod to the thrust transmitted thereto. Being so centered there is no need to give a precision finish to the counterbore 20, thereby reducing the cost of manufacture of the tappet.

The inward motion of the socket or thrust member 17 being limited by the shoulder 43, the abutting or bottoming of the member 17 thereagainst will serve to relieve the plunger 16 from distorting stresses imposed by an associated engine valve spring through the push rod 37 when the engine is idle. Likewise, because of the bottoming function of the socket member 17 the valve cage 21 is maintained in a spaced relation to the end closure member 14, preventing damage to the valve cage and obstruction of the bottom opening thereof against the end closure member.

The tappet 10 receives a supply of hydraulic fluid, such as the lubricating oil of the engine, through a radial port 45 located in the tubular member 12 and communicating with an oil channel 46 in the form of a relieved annular area in the outer wall of the tubular member. A port 48 in the plunger 16 places the reservoir 29 in communication with the port 45 via co-operating relieved areas 49 and 50 in the surface of the plunger 16, and in the bore 18, respectively.

The end closure member 14 presents a face or surface 54 which is adapted to be contacted by or to ride on a cam of the valve gear train, and for this reason is preferably hardened against wear by impact and abrasion. The closure member 14 may advantageously be made from metal having the desirable hardness or hardening characteristics, while the tubular portion 12 may be made from metal having more desirable properties for machining, lightness to reduce inertia, and the like.

The closure member 14 may be secured to the tubular portion 12 of the tappet body 11 in any suitable manner such as by welding or cementing. In the illustrated embodiment the tubular portion is reduced in diameter as at 56 and the closure member is provided with an axially extending annular portion 57 having an inner diameter adapted to closely receive the reduced portion 56 of the tubular member 12. A suitable cement 59 such as one of those known as epoxy resins may advantageously be used between the adjacent and co-operating surfaces of the closure member 14 and the tubular member 12 to create an effective and lasting bond therebetween.

It will be observed that, because the socket member 17 provides the previously mentioned bottoming function and since it is centered by the boss 39, the bore 18 in which the plunger 16 reciprocates may be of a diameter or size smaller than the other bores, and also that the bore 18 has the only inner surface of the body 11 that requires the expense of precision finishing. It will also be evident that by reason of such smaller diameter, and because of the composite or fabricated construction of the body 11, the bore 18 may be accurately finished before mounting the end closure member 14, and hence, by more efficient finishing procedures than can be utilized when finishing a closed or blind bore. Likewise, the stepped bores or counterbores 19 and 20 may both be effected by simple counterboring.

During use in the valve mechanism of an internal combustion engine, the tappet 10 transmits thrust to the push rod 37 through the plunger 16 and the thrust or socket member 17, the plunger being positioned in the bore 18 by a substantially incompressible body of oil in the pressure chamber 22. During each thrust stroke a small quantity of oil leaks out of the chamber 22 past the plunger, and during the period between such strokes oil is passed into the chamber 22 from the reservoir 29 through the check valve 31. In this manner the valve lash or end play is eliminated between successive thrust strokes.

A modified tappet embodying the invention is illustrated in Fig. 2, wherein certain parts correspond to those in the embodiment described above and have corresponding reference numerals.

The tappet of Fig. 2 is provided with a thrust or socket member 60 in axial engagement with the plunger 16. The socket member 60 is provided with a central boss 61, a radially extending flange 62, and a push rod receiving socket 63. The diameter of the flange 62, however, is such that the flange is closely and slidably received by the bore 20 and the socket member 60 is centered thereby, while the boss 61 is spaced somewhat from the wall of the plunger 16.

The socket member 60 functions as a closure for the reservoir 29 formed in the interior of the plunger 16, and additionally as a control against oil flow or leakage from the co-operating relieved areas 49 and 50. The flange 62 provides a bottoming function against the shoulder 43 in the modification of Fig. 2 in the same manner, and secures thereby the same advantages as previously described with respect to the tappet of Fig. 1.

Each of the embodiments described is provided with a spring retainer or keeper 65 disposed in a groove 66 in the counterbore 20. The keepers 65 serve to maintain the tappets in assembled condition during such times as they are not installed in an engine.

From the foregoing detailed description and the accompanying drawings, it will be appreciated that there has been provided by this invention certain novel arrangements and combinations of parts in the construction of hydraulic tappets, by reason of which the previously recited objects and advantages, as well as others, have been achieved.

Although the invention has been disclosed by providing a detailed description of different specific embodiments thereof, it will be understood that the invention is not to be limited thereto, but rather the invention includes those changes and modifications as are embraced by the scope of the claims hereof.

Having thus described my invention, I claim:

1. A hydraulic tappet comprising a hollow generally cylindrical body including an open ended tubular portion having a bore and a counterbore at one end and having a closure member at the other end thereof, a piston reciprocably mounted in said bore and having a reservoir therein, said piston defining a chamber between one end thereof and said closure member, and a socket member in axial engagement with the other end of said piston and being movable in said counterbore, said piston having a passage therein providing communication between said reservoir and said chamber, said closure member being mounted in sealing engagement with said tubular portion and said socket member being larger in diameter than said bore and overhanging said piston so as to be adapted to abut said tubular portion between said bore and said counterbore.

2. A hydraulic tappet comprising a hollow generally cylindrical body including an open ended tubular portion having a bore and a counterbore at one end thereof, a closure member closing one end of said tubular portion, a piston reciprocably mounted in said bore and having a reservoir therein, said piston defining a pressure chamber between one end thereof and said closure member, a socket member in axial engagement with the other end of said piston and reciprocable in one of said counterbores, said piston having a passage therein providing communication between said reservoir and said pressure chamber, check valve means for controlling fluid flow through said passage, said body portion presenting a shoulder between said bore and said counterbore, said socket member being in overhanging relation to said piston and being adapted to abut said shoulder.

3. A hydraulic tappet comprising a hollow generally cylindrical open ended body portion having a bore and first and second counterbores, a piston reciprocably mounted in said bore and having a hydraulic fluid reservoir therein, said piston defining in part a pressure chamber in said first counterbore, a socket member in axial engagement with said piston and arranged for reciprocation in said second counterbore, said piston having a passage therein providing communication between said reservoir and said chamber, valve means in said passage for controlling flow of fluid through said passage, said body portion presenting a shoulder between said bore and said second counterbore, said socket member being larger in diameter than said bore and adapted to overhang said piston and engage said shoulder, biasing means in said chamber urging said piston outwardly thereof and a closure member being applied to and closing an end of said body portion and having a greater degree of hardness than said body portion.

4. A hydraulic tappet of the character described comprising a tubular body member having in stepped relation first, second, and third bores, said first bore being smaller in diameter than said second and third bores and extending therebetween, said first and second bores defining a transversely extending shoulder therebetween, a piston reciprocably mounted in said first bore, a thrust member in axial engagement with said piston and adapted to reciprocate therewith in said second bore, and end closure means mounted on said tubular member and defining with said piston a pressure chamber in said third bore, said tubular body member having a hydraulic fluid inlet port therein, said piston having a passage therein providing communication between said inlet port and said chamber, said thrust member being substantially smaller in diameter than said second bore and larger than said first bore whereby said thrust member is adapted to axially engage and be limited in motion by said shoulder.

5. A hydraulic tappet of the character described comprising a tubular body member having in stepped relation first, second and third bores, said first bore being smaller in diameter than said second and third bores and extending therebetween, said first and second bores defining a transversely extending shoulder therebetween, a substantially hollow piston having an open end reciprocably mounted in said first bore, a thrust member axially engaging said piston and having a central boss in centering engagement with the open end of said piston, an end closure member mounted on said tubular body member adjacent said third bore and defining with said piston a pressure chamber therein, said tubular body member having a hydraulic fluid inlet port therein, said piston having a fluid conducting passage therein providing communication between said inlet port and said chamber, said thrust member being substantially smaller in diameter than said second bore and larger than said first bore whereby said thrust member is adapted to axially engage and be limited in motion by said shoulder.

6. A hydraulic tappet as defined in claim 5, including check valve means in said passage for opposing flow of hydraulic fluid out of said chamber through said passage, and wherein said end closure member is of harder material than said tubular body member.

7. A hydraulic tappet of the character described comprising a tubular body member having a bore extending between first and second counterbores, said bore and said first counterbore defining a transversely extending shoulder therebetween, a piston having a reservoir therein and reciprocably mounted in said bore, a thrust member in said first counterbore and in axial engagement with said piston, an end closure member mounted on said tubular member and presenting a cam contacting surface, said closure member and said piston defining a pressure chamber in said second counterbore, said tubular member having a hydraulic fluid inlet port therein, said piston having fluid passage means providing communication between said inlet port and said reservoir and between said reservoir and said pressure chamber, check valve means in said passage means for preventing hydraulic fluid from passing from said chamber to said reservoir, said thrust member having a push rod receiving socket and being of larger diameter than said bore, and spring means in said chamber urging said piston outwardly thereof, said thrust member being adapted to axially engage said shoulder and be limited in motion thereby.

References Cited in the file of this patent
UNITED STATES PATENTS 2,840,063     Purchas  ---------------- June 24, 1958